E. Mingay,
Molasses Pitcher,
No. 18,645. Patented Nov. 17, 1857.
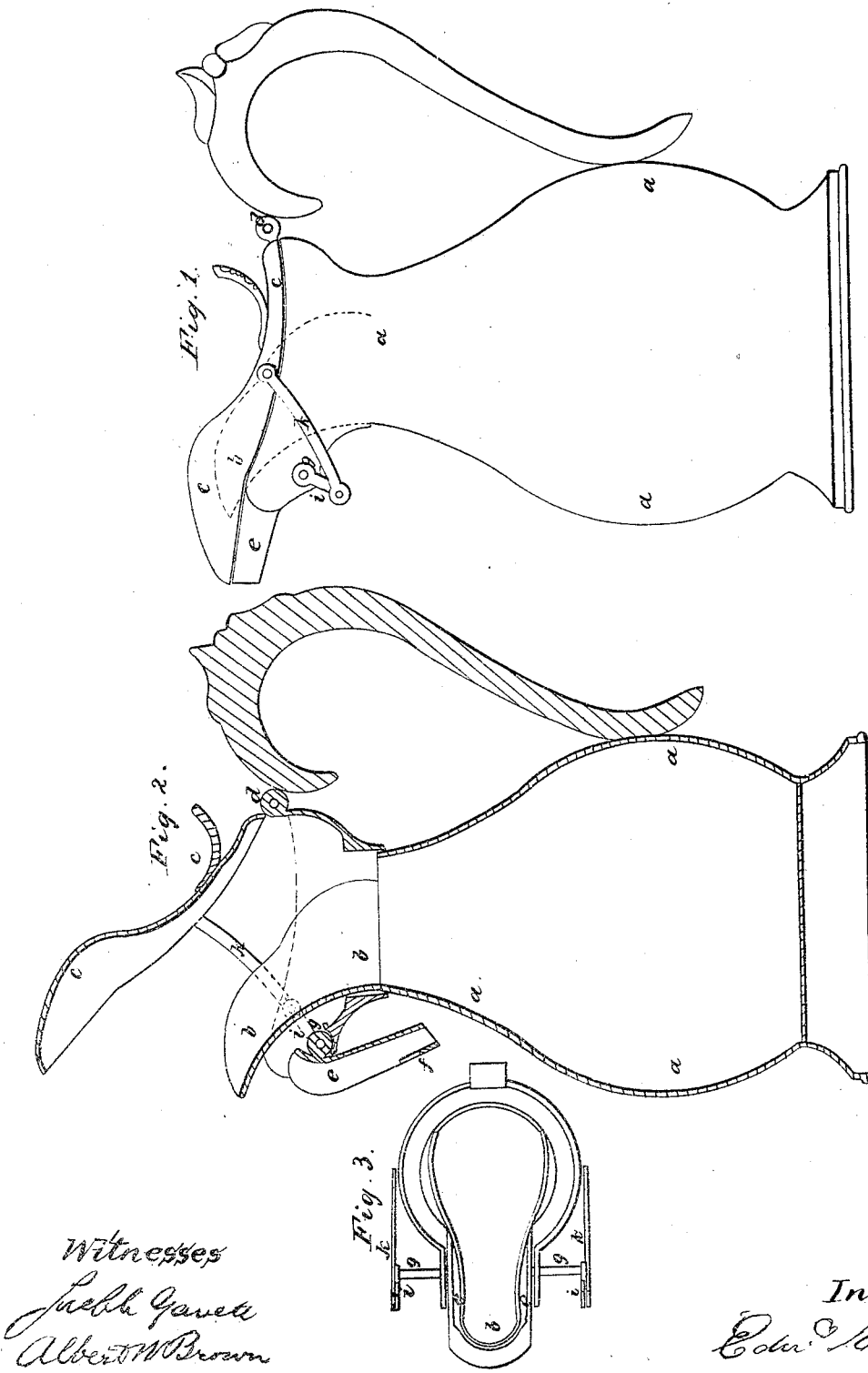
Witnesses
Joseph Gavett
Albert W. Brown
Inventor
Edw. Mingay

UNITED STATES PATENT OFFICE.

EDWARD MINGAY, OF BOSTON, MASSACHUSETTS.

PITCHER FOR MOLASSES, &c.

Specification of Letters Patent No. 18,645, dated November 17, 1857.

*To all whom it may concern:*

Be it known that I, EDWARD MINGAY, of Boston, in the county of Suffolk and State of Massachusetts, have invented certain new and useful Improvements in Pitchers for Containing Liquids, and that the following description, taken in connection with the accompanying drawings, hereinafter referred to, forms a full and exact specification of the same, wherein I have set forth the nature and principles of my said improvements by which my invention may be distinguished from others of a similar class, together with such parts as I claim and desire to have secured to me by Letters Patent.

The figures of the accompanying plate of drawings represent my improvements.

Figure 1 is a side elevation of my improved pitcher. Fig. 2 is a central vertical section of the same. Fig. 3 is a plan or top view of the pitcher with the cover removed.

The present invention consists in a new construction of pitchers for containing molasses syrups and other liquids the object aimed at being the preventing of the dripping of the liquid after a portion of it has been poured out and after the cover has been shut, which has invariably occurred by the use of pitchers of ordinary construction.

By my improvements the dripping is effectually prevented the surplus liquid or drippings being received by a movable spout or receptacle which is made to drop by the opening of the cover and is raised up so as to receive the drippings and convey them to the body of the pitcher by the shutting of the cover.

$a\ a\ a$ in the drawings represents the body of the pitcher or receptacle for the liquid.

$b\ b$ is the nose or delivery spout of the pitcher attached to the body $a\ a$ as shown.

$c\ c$ is the cover constructed in the ordinary manner and turning upon a hinge at $d$.

$e$ is a spout or receptacle for receiving the drippings constructed with a lip $f$. The spout $e$ is attached to a turning rod $g\ g$ having its bearing in the top portion of the pitcher which is attached to the cover $h$ by the lever arms $i$—$k$. By inspection of Figs. 1 and 2 which respectively represent the cover as shut and open the manner in which the spout $e$ is raised and lowered through the lever arms $i$—$k$ by the movement of the cover will be readily understood so that while the liquid is being poured out of the nose $b\ b$ (and the cover of course opened) the spout $e$ is turned down out of the way as shown in Fig. 2 while as soon as the cover is shut the spout $e$ will be raised into the position shown in Fig. 1 so as to catch the drippings and convey them to the main body of the pitcher through the nose $b\ b$.

It will be observed that the nose $b\ b$ is so placed that the cover $h$ and spout $e$ when shut together extend beyond it, and that when the liquid is so frequently poured out that it does not entirely drain from the spout back into the pitcher, the lip $f$ will prevent any escape of the drippings from the spout.

Having thus described my improvements I shall state my claim as follows:

What I claim as my invention and desire to have secured to me by Letters Patent is—

The means employed to prevent the "dripping" of liquids in pitchers for containing liquids the same consisting of the movable spout or jaw actuated by the opening or closing of the cover so as to raise and lower the said spout or jaw substantially as set forth.

EDWD. MINGAY.

Witnesses:
JOSEPH GAVETT,
ALBERT W. BROWN,